(12) United States Patent
Niewczas et al.

(10) Patent No.: US 9,036,750 B2
(45) Date of Patent: May 19, 2015

(54) METHOD AND APPARATUS FOR RECEIVER FREQUENCY ERROR COMPENSATION

(75) Inventors: Jaroslaw Marek Niewczas, Jozefow (PL); Karsten Brüeninghaus, Salzgitter (DE); Ansgar Scherb, Lauf an der Pegnitz (DE); Bartosz Wasilewski, Letchworth Garden City (GB)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 636 days.

(21) Appl. No.: 13/141,521

(22) PCT Filed: Dec. 23, 2008

(86) PCT No.: PCT/EP2008/068233
§ 371 (c)(1),
(2), (4) Date: Aug. 15, 2011

(87) PCT Pub. No.: WO2010/072263
PCT Pub. Date: Jul. 1, 2010

(65) Prior Publication Data
US 2011/0293049 A1   Dec. 1, 2011

(51) Int. Cl.
*H03D 1/06* (2006.01)
*H04L 25/03* (2006.01)
*H04L 27/00* (2006.01)

(52) U.S. Cl.
CPC ...... *H04L 25/03273* (2013.01); *H04L 27/0014* (2013.01)

(58) Field of Classification Search
USPC .................. 375/348, 324, 346, 349
See application file for complete search history.

(56) References Cited

U.S. PATENT DOCUMENTS

2008/0273641 A1\* 11/2008 Yang et al. ............... 375/359

FOREIGN PATENT DOCUMENTS

| EP | 0959568 A1 | 11/1999 |
| WO | 98/34357 | 8/1998 |
| WO | 02/29978 A2 | 4/2002 |
| WO | 2008/006662 A1 | 1/2008 |

OTHER PUBLICATIONS

Okanoue, K. et al. "An MLSE Receiver with Carrier Frequency Estimator for TDMA Digital Mobile Radio." Proceedings of the Nordic Seminar on Digital Land Mobile Radio Communications, Oslo, Norway, Jun. 26-28, 1990.

\* cited by examiner

*Primary Examiner* — Kabir A Timory
(74) *Attorney, Agent, or Firm* — Coats & Bennett, P.L.L.C.

(57) ABSTRACT

This disclosure presents a receiver apparatus (10) and corresponding method that advantageously use ISI-canceling combining weights, as are generated for ISI suppression in the receiver's data signal combining operations, to suppress the effects of ISI from determinations of receiver frequency error. Such suppression yields more accurate receiver frequency error determination and, correspondingly, improved receiver frequency error compensation.

22 Claims, 4 Drawing Sheets

METHOD AND APPARATUS FOR RECEIVER FREQUENCY ERROR COMPENSATION

TECHNICAL FIELD

The present invention generally relates to wireless communication signal receivers, and particularly relates to a method and apparatus for frequency error compensation in wireless communication receivers.

BACKGROUND

Reception frequencies of wireless communication receivers generally should be precisely maintained relative to the transmit signal frequencies of interest. For example, if the down-conversion mixer in a wireless communication receiver operates with an erroneous frequency offset relative to the carrier frequency of the incoming communication signal, symbol demodulation and decoding will be compromised, even for very slight errors. Frequency offset correction therefore is generally required in wireless communication receivers, to compensate for Doppler shifts due to mobility and clock differences in the transmitter and receiver.

Frequency offset correction often is broadly referred to as Automatic Frequency Control (AFC), although there are a variety of known compensation techniques generally falling under the ambit of AFC. A top-level AFC, which generally provides relatively coarse frequency offset correction, is implemented in the analog domain of a receiver's front-end and involves the trimming of oscillators used for generating down-conversion signals at the proper frequency. A receiver might, for example, adjust the capacitance controlling oscillator's speed.

Additional AFC offering greater precision is also known. In an example of this, a digital de-rotator is used to correct signal samples for frequency offsets. While this approach advantageously offers a finer resolution than practically obtainable with coarse AFC, de-rotation requires very accurate measurements of receiver frequency error. Known approaches therefore commonly rely on measurements only from the strongest signal paths, to make frequency error determinations. Further, because such determinations conventionally suffer the effects of ISI and other received signal impairments, heavy filtering is used. Such filtering results in relatively slow correction responses. As such, these approaches are relatively poor at correcting faster changing frequency errors and are essentially useless in correcting transient frequency errors arising from clock jitter, for example.

SUMMARY

This disclosure presents a receiver apparatus and corresponding method that advantageously use ISI-canceling combining weights, as are generated for ISI suppression in the receiver's data signal combining operations, to suppress the effects of ISI from determinations of receiver frequency error. Such suppression yields more accurate receiver frequency error determination and, correspondingly, improved receiver frequency error compensation.

One embodiment provides a method of correcting for receiver frequency error in an ISI canceling receiver that is configured to generate ISI-canceling combining weights in each reception time slot for combining received signal values in the reception time slot. The method includes de-rotating received signal values for demodulation processing by an amount corresponding to a determined receiver frequency error, and calculating phase changes between reception time slots by, for any given pair of current and prior reception time slots, calculating the phase change (e.g. the current reception time slot and a preceding time slot) as a function of the combining weights determined in one of the reception time slots and pilot values or corresponding channel estimates (values derived from the pilot values, e.g. in that phase angles of the pilot symbols are de-rotated to zero) for the other one of the reception time slots. The method further includes determining the receiver frequency error, as used for de-rotating the received signal values, as a function of the calculated phase changes.

Another embodiment provides a wireless communication receiver that is configured to generate ISI-canceling combining weights in each reception time slot, for combining received signal values in the reception time slot. The wireless communication receiver includes one or more processing circuits that are configured to de-rotate received signal values for demodulation processing by an amount corresponding to a determined receiver frequency error. The processing circuits further are configured to calculate phase changes between reception time slots by, for any given pair of reception time slots, calculating the phase change as a function of the combining weights determined in one of the reception time slots and pilot values or corresponding channel estimates for the other one of the reception time slots. Still further, the processing circuits are configured to determine the receiver frequency error, as used for de-rotating the received signal values, as a function of the calculated phase changes.

Of course, the present invention is not limited by the above summary of features and advantages. Those skilled in the art will appreciate additional features and advantages upon reading the following detailed description, and upon viewing the accompanying illustrations of example embodiments.

DETAILED DESCRIPTION

Figure 1:
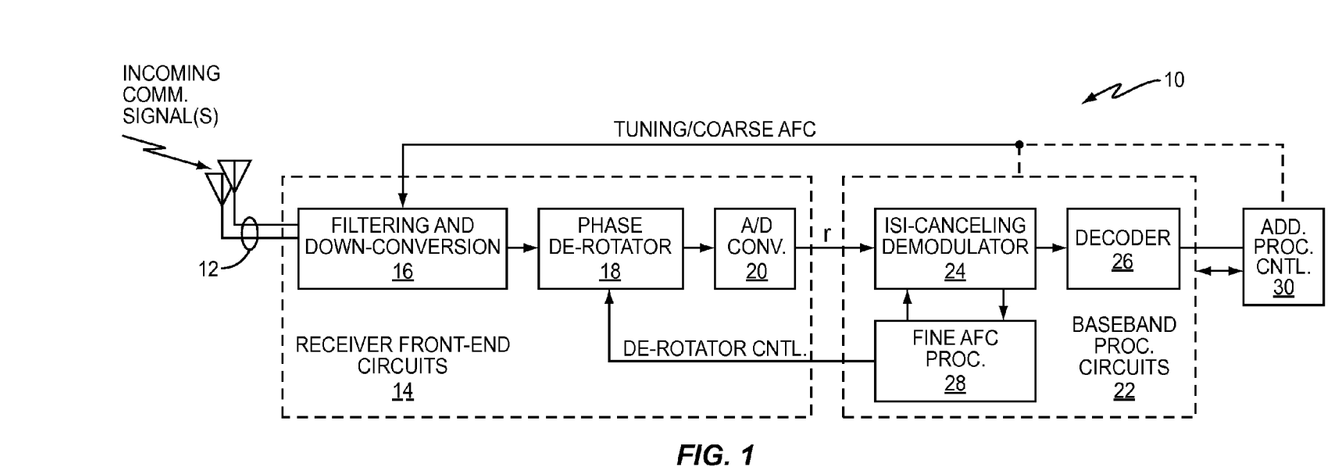
FIG. 1 is a block diagram of one embodiment of a wireless communication receiver.

By way of non-limiting example, FIG. 1 illustrates one embodiment of a wireless communication receiver 10, such as cellular radiotelephone, wireless pager, computer, network interface card, or other electronic device, system or access terminal with wireless communication capability. In this embodiment, the receiver 10 includes one or more antennas 12; a receiver front-end 14, including filtering/down-conversion circuit 16, a phase de-rotator 18, an analog-to-digital converter (ADC) 20; baseband processing circuits 22, including an Inter-symbol Interference (ISI) canceling demodulator 24, a decoder 26, a fine Automatic Frequency Control (AFC) processor 28; and one or more additional processing and control circuits 30, such as a system microprocessor, power control, etc. For diversity operation, MIMO operation, etc., the antenna(s) 12 comprise at least two receive antennas, and in one or more such embodiments the receiver front-end 14 includes corresponding "receiver chains" for filtering, amplifying, and downconverting the received signals incoming on the different antennas 12.

As a general proposition, the frequency of the receiver 10 should match the transmission frequency (or frequencies) of the incoming communication signals. For example, the mixing frequency used in the receiver's front-end circuits 14 for down-converting incoming communication signals should match the carrier frequency of the incoming communication signals, or be some precise fraction thereof. As an example, the filtering and down-conversion circuits 16 include one or more oscillator circuits, e.g., one or more variable-frequency crystal-based oscillators that are set to precise oscillation frequencies for down-converting received communication signals having particular carrier frequencies. Frequency error degrades the reception performance of the receiver 10.

The receiver 10 as presented herein improves its reception performance with respect to incoming communication signals by performing a "fine" Automatic Frequency Control (AFC) on an ongoing basis. The term "fine" as used here is meant to draw a contrast between the relatively small frequency error compensation adjustments made by the fine AFC processor 28, and the type of "coarse" or first-level AFC performed by the receiver 10 via adjusting or trimming its oscillator-based down-conversion circuitry in the receiver front-end circuits 14.

The fine AFC also may be understood as "inter-slot" frequency error compensation, because the receiver frequency error at issue is determined across or between reception time slots, and applied on an ongoing basis, such as by averaging the frequency errors determined between succeeding pairs of reception time slots and making de-rotation control adjustments to the phase de-rotator 18 as needed, responsive to the average frequency error. More particularly, the receiver 10 is an inter-symbol interference, ISI, canceling receiver that generates (data) combining weights in each reception time slot, and is configured implement a method of correcting for receiver frequency error that advantageously uses those combining weights to suppress the effects of ISI from its determinations of receiver frequency error.

In one or more embodiments, the method comprises de-rotating received signal values for demodulation processing by an amount corresponding to a determined receiver frequency error. For example, the fine AFC processor 28 maintains a control word or setting that controls the amount of de-rotation applied by the phase de-rotator 18, and updates that control setting based on its determinations of receiver frequency error.

As such, the method further includes calculating phase changes between reception time slots by, for any given pair of current and prior reception time slots, calculating the phase change as a function of the combining weights determined in one of the reception time slots and pilot values or corresponding channel estimates for the other one of the reception time slots. Here, those skilled in the art will appreciate that the receiver 10 is an ISI-canceling receiver, and thus generates combining weights specific to each given reception slot, based on estimating interference and other received signal impairment correlations for each such slot.

Thus, in one or more embodiments, the AFC processor 28 computes phase changes on a running basis, by computing the phase change between given pairs of current and prior reception time slots, and uses the calculated phase changes to determine the receiver frequency error. In a particular, embodiment, the method depends on using the combining weights generated for a given prior reception time slot to combine pilot values received for a current reception time slot. Equivalently, the prior slot's combining weights are used to combine channel estimates determined from the current slot's pilot values. Using the prior slot's combining weights in conjunction with the current slot's pilot values or corresponding channel coefficients allows the receiver 10 to calculate the phase change between slots arising from receiver frequency error in a manner that is substantially free from the effects of ISI. Correspondingly, the method further includes determining the receiver frequency error, as used for de-rotating the received signal values, as a function of the calculated phase changes.

Of course, it should be understood that the "opposite" processing can be used, in that the pilot values or corresponding channel weights from a prior reception time slot can be combined using the combining weights generated for a current reception time slot. Thus, the calculation of phase change that arises between reception time slots because of receiver frequency error is based on, for any given pair of current and prior reception time slots, using the (equalization) combining weights generated for one of the reception time slots to combine the pilot values or corresponding channel weights of the other reception time slot.

For ease of reference herein, the above method and supporting receiver operations are referred to as "inter-slot frequency error compensation." As described later herein, the one or more (baseband) processing circuits 22 additionally or alternatively may be configured to perform "intra-slot frequency error compensation." Explanation of intra-slot frequency error compensation is deferred until later in this disclosure.

As for at least one embodiment of inter-slot frequency error compensation, the one or more processing circuits 22 of the receiver 10 are configured to determine the receiver frequency error by filtering the calculated phase changes to obtain a filtered receiver frequency error value. As an example, the receiver 10 calculates the phase change for each pair of succeeding reception time slots, and averages or otherwise filters those calculated values (which may be represent the phase error in degrees of offset or rotation). The processing circuits 22 are further configured to adjust the phase de-rotator 18 responsive to the filtered receiver frequency error value exceeding an adjustment step size of the phase de-rotator 18. In other words, the phase de-rotator 18 practically has a finite adjustment resolution, e.g., the amount of signal value de-rotation applied by it can be incremented and decremented in step of 10 Hz. As such, at least one embodiment of the fine AFC processor 28 is configured to monitor the filtered value of the inter-slot frequency error and change the phase de-rotator control setting upon that filtered value exceeding half the adjustment resolution step size of the phase de-rotator 18.

Further, in at least one embodiment, the processing circuits 22 are configured to calculate the phase change between reception time slots by, for a given current reception time slot and a given prior reception time slot, generating a complex combined value by combining pilot values or corresponding channel coefficients from the given current reception time slot using combining weights computed for the given prior reception time slot. In particular, the processing circuits 22 determine the phase change between the given current and prior reception time slots from the combined value. The prior reception time slot preferably is the immediately preceding slot, such that the receiver 10 operates on successive pairs of reception time slots. Such operation may be modified if, for example, channel conditions change slowly with respect to reception time slot intervals. In such instances, phase error could be calculated across multiple slots, and then averaged or otherwise used.

Figure 2:
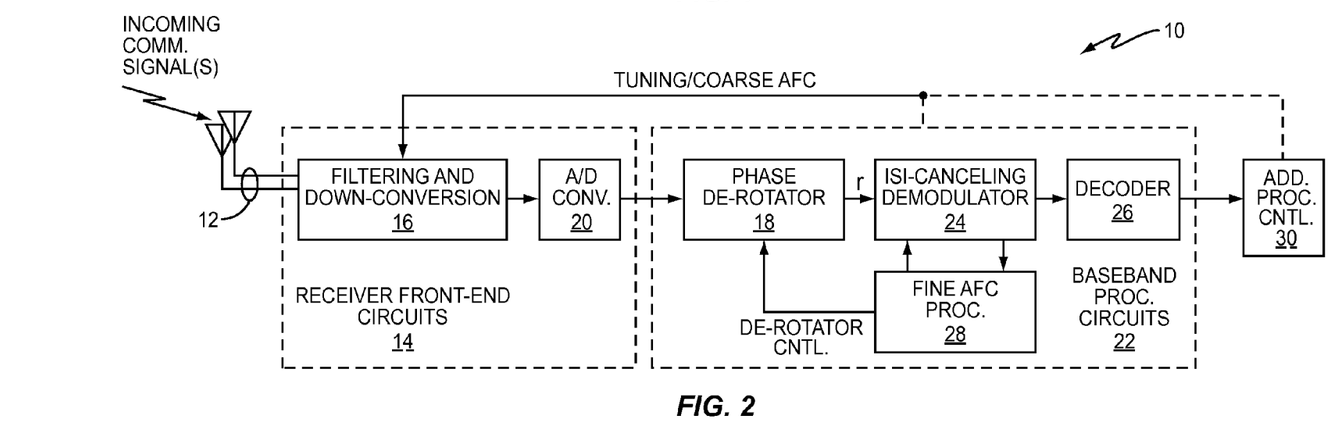
FIG. 2 is a block diagram of another embodiment of a wireless communication receiver.

The inter-slot frequency error compensation can be applied by the phase de-rotator 18 in either the analog domain or the digital domain. In FIG. 1, the phase de-rotator 18 operates on incoming received signal samples in the analog domain, while FIG. 2 depicts the phase de-rotator operating within the digital domain. In at least this latter case, the phase de-rotator may be functionally implemented within a microprocessor, digital signal processor, Field Programmable Gate Array (FPGA), Complex Programmable Logic Device (CPLD), Application Specific Integrated Circuit (ASIC), or other form of digital processor(s) used to implement the processing circuits 22.

The phase de-rotation control signal provided by the fine AFC processor 28 to implement inter-slot frequency error compensation therefore can be an analog domain signal, or a digital domain signal. An example analog signal is a variable voltage signal, while an example digital signal is a multi-bit control word. Correspondingly, the control interface of the phase de-rotator 18 is analog or digital, in dependence on the control signal domain and interface details. Those skilled in the art will therefore appreciate that inter-slot frequency error compensation by the fine AFC processor 28 practically is implemented by controlling the amount of phase de-rotation applied to incoming received signal values, either in the analog or digital domains. While such de-rotation generally is applied on an ongoing basis, with the amount of de-rotation adjusted from time to time, received signal values preferably are rotated in advance of any demodulation processing, including path searching, despreading, combining, impairment correlation estimation, etc.

Advantageously, the amount of phase de-rotation applied by the phase de-rotator 18 is determined from the phase error zeroing inherent in the receiver's ISI cancellation processing. As part of that processing, the receiver 10 obtains signal values for a received communication signal at multiple "processing delays" and performs a weighted combination of those values to obtain a combined signal for further processing, e.g., decoding. Absent receiver frequency error, the combining weights determined within any given reception time slot yield combined signal values with zero phase error. However, residual receiver frequency error remaining after coarse frequency error compensation in the filtering and down-conversion circuits 16 is manifested as a rotating phase error that the receiver 10 calculates with high accuracy, substantially free from the effects of ISI. That is, the receiver 10 proposed herein makes novel and inventive use of the receiver's ISI-canceling combining weights to determine frequency error based on discerning the phase changes across reception time slots arising from such error.

In more detail, the receiver 10 obtains received signal values at multiple "processing delays," at least some of which may correspond to radio channel path delays, and combines them using calculated combining weights. Examples of such processing are well understood by those skilled in the art, and include linear equalization receiver architectures, where the combining weights are used to linearly combine signal samples in a feedforward filter process. Non-limiting examples of such processing include "Generalized" Rake (G-Rake) processing and chip equalization (CE) processing. For example G-Rake information, see U.S. Pat. No. 6,922, 434 to Wang, et al. (issued 26 Jul. 2005); Bottomley et al. "A Generalized RAKE Receiver for Interference Suppression" IEEE Journal Communications, vol. 18, No. 8, Aug. 2000; and Wang et al. "Generalized RAKE Reception for Cancelling Interference from Multiple Base Stations", Proceedings of IEEE VTS Vehicular Technology Conference, Fall, 2000, Boston. For example CE information, see U.S. Pub. No. 2006/0182204 to Cairns et al.

The combining weights are generated for a given reception time slot and ideally remove channel effects and ISI from the signal samples being combined within that slot, for the given set of processing delays. However, to the extent that receiver frequency error remains after any coarse AFC, the combining weights calculated for the processing delays at a current reception time will differ from the combining weights calculated for the same processing delays at a prior reception time. In particular, the combining weights for a given set of processing delays change as a function of the frequency-error induced phase rotation that is manifest across successive reception times. Accordingly, the receiver 10 implements a novel and inventive use of combining weights to determine the amount of phase rotation across reception time slots, as a basis for controlling the amount of phase de-rotation applied by the phase de-rotator 18.

Figure 3:
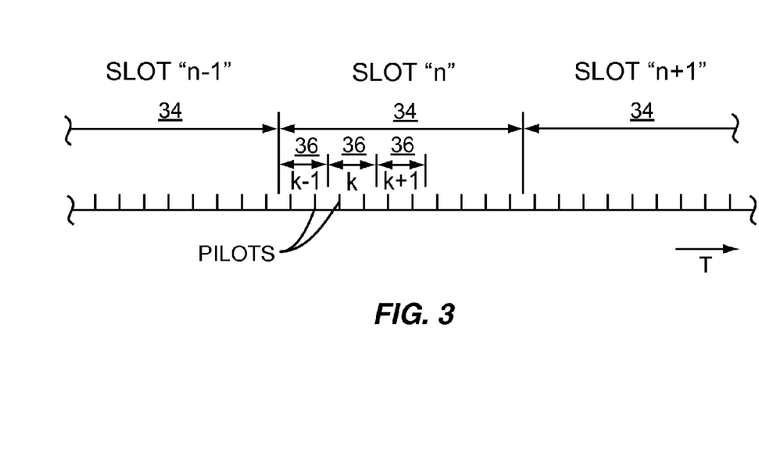
FIG. 3 is a received signal structure diagram, illustrating reception time slots and sub-slots.

In more detail, FIG. 3 illustrates an example of slot-based received signal timing, wherein the received communication signal is processed in a series of successive time slots 34. "Slots" in this sense should be construed broadly. For example, they may be logically imposed by the receiver 10 on an incoming received signal stream. On the other hand, slot timing may be imposed inherently by the transmit signal structure of the received communication signal(s). For example, Wideband CDMA (WCDMA) uses a channel bit rate of 5.76 Mbps, a frame length of 10 ms (38,400 chips), with 15 slots per frame yielding 2,560 chips per slot.

In such arrangements, a Common Pilot Channel (CPICH) received by the receiver 10 as a component of the incoming communication signals(s) provides 10 pilot symbols per slot 34, which can be used for channel estimation and combining weight determination in each slot 34. Thus, in one or more embodiments, the slots 34 used by the receiver 10 are defined by and synchronized with the transmission slot timing of the received communication signal(s) being processed. The illustration also depicts the optional subdivision of each slot 34 into a plurality of sub-slots 36, for intra-slot ("instantaneous") frequency error compensation described later herein.

In the context of FIG. 3, the receiver 10 generates combining weights for each slot 34, and uses those combining weights to combine received signal values (e.g., despread data symbols) within the slot 34. These combining weights are ISI-canceling in that they are generated as a function of the current slot's channel estimates and impairment correlation estimates. In this regard, the receiver 10 suppresses the effects of ISI from its determination of receiver frequency error by determining the phase change between a current slot n and slot n−1, for example, based on using combining weights from slot n−1, w(n−1), to combine pilot values or corresponding channel coefficients in slot n, to obtain a complex combined value—i.e., real and imaginary components—that should have zero phase angle if receiver frequency error is zero (or should have the nominal pilot symbol phase angle).

Figure 4:
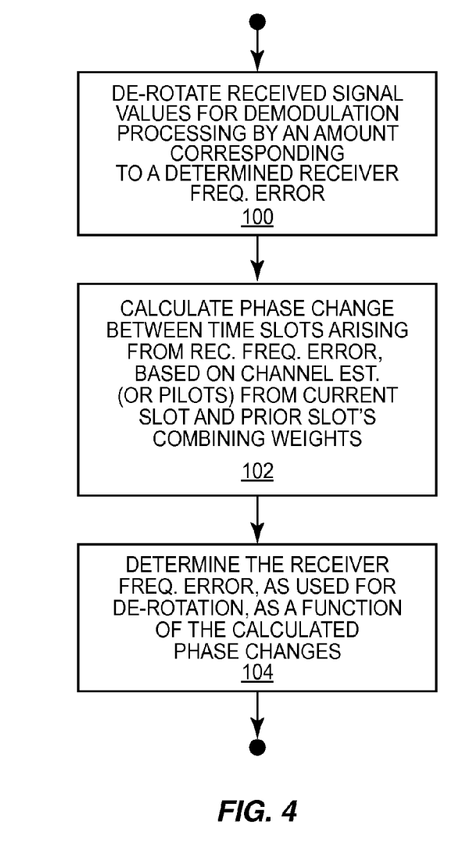
FIG. 4 is a logic flow diagram of one embodiment of inter-slot frequency error compensation in a wireless communication receiver.

To better understand this processing, FIG. 4 illustrates an embodiment of the inter-slot frequency error compensation contemplated herein. The illustrated processing may, in at least some respects, be performed in an order different from that shown, and the processing may be performed in conjunction with other received signal processing functions. In one embodiment, the receiver 10 includes a digital processor (microprocessor, digital signal processor, etc.) that is specially configured via execution of stored program instructions (e.g., a computer program) to carry out the illustrated processing. In another embodiment, the receiver 10 includes hardware circuits that are configured to implement the illustrated processing. Broadly, those skilled in the art will recognize that the illustrated processing, such as carried out by the one or more processing circuits denoted as baseband processing circuits 22, can be implemented in hardware, software, or any mix thereof.

The illustrated processing "begins" with the receiver 10 de-rotating received signal values for demodulation processing by an amount corresponding to a determined receiver frequency error (Block 100). In at least one embodiment, this action represents an ongoing process in which a given amount of de-rotation is applied to incoming signal values in either the analog or digital domains. Processing continues with or otherwise includes calculating a phase change between reception time slots arising from receiver frequency error, as a function of pilot values or channel estimates determined for a current reception time slot and the combining weights determined for a prior reception time slot (Block 102).

In one or more embodiments, the receiver 10 determines the phase change by combining channel estimates (or pilot values) for the current time slot using the combining weights generated for use in the prior slot. Preferably, the receiver 10 combines net channel coefficients for the current reception time slot 34 (e.g., slot n) using combining weights generated by the receiver 10 for data combining in the prior reception time slot 34 (e.g., slot n–1).

Processing further includes determining the receiver frequency error used for de-rotating the received signal values as a function of the calculated phase changes (Block 104). These actions are, in one or more embodiments, done in parallel with or as a background process to the actions of Block 100. For example, the receiver 10 may calculate phase changes over succeeding pairs of reception time slots, and use each calculated phase change to update an average receiver frequency error value. Then, in response to the average receiver frequency value exceeding the frequency adjustment resolution of the phase de-rotator 18, the receiver 10 makes a corresponding adjustment to the amount of phase de-rotation being applied to the incoming received signal samples by the phase de-rotator 18. Thus, the receiver 10 can be understood as dynamically maintaining updated estimations of receiver frequency error, based on ongoing measurements and calculations.

Figure 5:
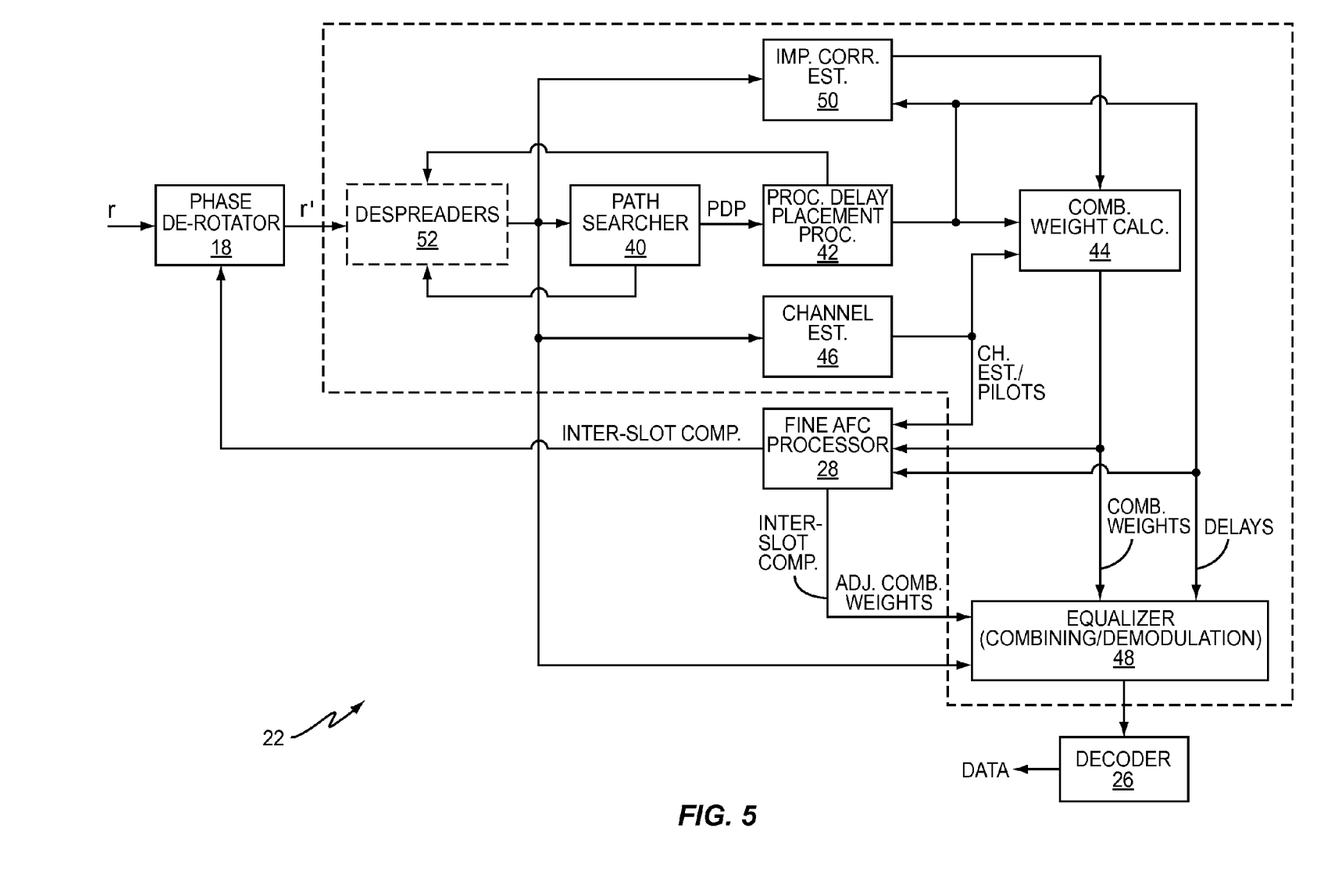
FIG. 5 is a block diagram of another embodiment of a wireless communication receiver.

By way of non-limiting example, FIG. 5 illustrates an embodiment of the receiver 10 that is configured to carry out the above processing, or variations of it. More particularly, FIG. 5 focuses on one embodiment of the baseband processing circuits 22. The illustrated baseband processing circuits 22 include a path searcher 40, a processing delay placement processor 42, a combining weight calculator 44, a channel estimator 46, an equalizer 48, and an impairment correlation estimator 50. The equalizer 48 may be implemented, for example, as a G-Rake receiver or as a chip equalizer.

For G-Rake embodiments, the placement processor 42 places Rake fingers—e.g., aligns a despreading correlator in each finger with a given processing delay offset. For chip equalizer embodiments, the placement processor 42 sets or otherwise selects equalization filter tap delays according to the desired processing delays. Identification of the processing delays (e.g., $d_1, d_2, d_3, \ldots$) to be used for demodulation processing of received signal values depends on the path searcher 40 identifying at least the most significant propagation paths for the incoming communication signals, e.g., it generates a Power Delay Profile (PDP) that identifies a number of path delays (e.g., $\tau_1, \tau_2, \tau_3, \ldots$). Path searching generally is an ongoing process, such that path identification updates dynamically. The processing delay placement processor 42 uses the path information to identify a plurality of processing delays at which the received signal will be processed. Note that some processing delays are placed on-path (i.e., aligned with the identified multipath propagation delays), and one or more processing delays are placed off-path, to provide for better interference characterization. For example, when implemented as a G-Rake receiver, the receiver 10 uses some number of its Rake fingers as "probing" fingers that are placed at defined offsets relative to one more paths, for interference characterization.

The impairment correlation estimator 50 characterizes the correlation of interference across the processing delays, e.g., between Rake fingers or equalization filter taps. For example, the impairment correlation estimator 50 generates an impairment covariance matrix, whose elements represent the covariance of interference between fingers, taps, etc. In turn, the combining weight calculator 44 generates combining weights for the n-th slot, w(n), based on the impairment covariance matrix. Weighting the signal value from each of the processing delays by its corresponding combining weight and combining those weighted values suppresses correlated interference, including ISI, from the resultant combined value.

In general, the combining weight calculator 44 generates combining weights, e.g., a vector of weights corresponding to the processing delays, as a function of the channel estimates determined for the processing delays and the impairment correlation estimates characterizing the correlation of signal impairment between the delays. As is known in the art, in a G-Rake receiver embodiment of the receiver 10, the combining weights are used to combine despread data values obtained from the received signal at the processing delays. In a chip equalizer embodiment of the receiver 10, the combining weights are used to combine chip samples of the received signal at sample delays corresponding to the processing delays.

In any case, the combining weights incorporate knowledge of interference correlation across the processing delays via the impairment correlation estimates. Therefore, weighted combining of data values is used by the receiver 10 to suppress ISI from received data symbols, and such operation is, in a general sense, well known. However, in the novel and inventive processing presented herein, the combining weights are advantageously also used to more accurately determine receiver frequency error. That is, the receiver 10 exploits the ISI-canceling properties of the combining weights to determine the amount of receiver frequency error remaining after any coarse AFC applied in the receiver's front-end circuitry 16.

As was broadly described for Block 102 in FIG. 4, the receiver 10 calculates the phase change between given time intervals, e.g., between successive reception time slots 34, that arises from receiver frequency error. The calculation advantageously exploits the receiver's ISI-cancellation properties to improve the accuracy of frequency error measurement. Specifically, in a G-Rake embodiment of the receiver 10, it is proposed to combine pilots (pilot symbol information) on some or all processing delays (fingers) using the combining weights computed in a previous time slot. Preferably, all of the processing delays are used, rather than just those processing delays aligned to the strongest ones of the path delays. The resulting pilot phase will be indicative of the phase change that occurred between slots and, advantageously, the indicated phase will not be affected by ISI.

As an example, assume that there are L propagation paths and that the placement processor 42 (FIG. 5) has placed M G-Rake fingers or CE filter taps on/around these paths. For example, L=1, 2, ..., 5, and M=10, 12, ..., 16, or even 24 fingers or taps. In a given reception time slot, the receiver 10 uses the received pilot symbols (e.g., 10 pilots per slot in WCDMA) to generate a vector of net channel estimates, $\hat{h}(n)$, where $\hat{h}(n)$ comprises an L×1 column vector of complex channel coefficients determined for the current slot, n, based on the pilot symbols received in slot n. The net channel estimates $\hat{h}(n)$ are combined using the combining weights w(n−1) from the previous slot, n−1.

The combining weights of interest here can be, for any given slot n, computed using known techniques, such as $$w(n) = \hat{R}_u^{-1}(n)\hat{h}(n), \quad \text{Eq. (1)}$$

where the impairment correlation matrix, $\hat{R}_u(n)$, for the n-th slot is determined, for example, as $$\hat{R}_u(n) = \frac{1}{N_p - 1} \sum_{k=0}^{N_p-1} (x_p(k)s^* - \hat{h}(n))(x_p(k)s^* - \hat{h}(n))^H, \quad \text{Eq. (2)}$$

where $N_p$ is the number of pilots received in the slot, $x_p(k)$ is the k-th pilot symbol within slot n, and s* is the conjugate of the known pilot symbol value. Of course, those skilled in the art will recognize that there are numerous known methods for computing impairment correlation estimates to be used in G-Rake, chip equalizer, or other ISI-canceling receivers. For non-limiting examples of known approaches to impairment correlation computations, one may refer to the commonly owned and co-pending U.S. patent application, entitled "Method and Apparatus for Efficient Estimation of Interference in a Wireless Receiver," as filed on 5 Jun. 2008 and assigned application Ser. No. 12/133,636.

Thus, in one or more embodiments, the receiver 10 uses pilots or channel estimates from slot n and the combining weights from slot n−1 to obtain a (complex) combined value ψ as $$\psi(n) = w^H(n-1) \cdot \hat{h}(n), \quad \text{Eq. (3)}$$

where "H" denotes the Hermitian operator and, as noted, $\hat{h}(n)$ is the vector of complex net channel coefficients generated for the current time slot, and w(n−1) is the vector of combining weights computed in the prior slot.

In Multiple-Input-Multiple-Output (MIMO) or diversity reception embodiments of receiver 10 with more than one antenna 12 for receiving incoming signals, the combined value from Eq. (3) can be formed for an antenna 1/antenna 2 example as $$\psi(n) = w_1^H(n-1) \cdot \hat{h}_1(n) + w_2^H(n-1) \cdot \hat{h}_2(n), \quad \text{Eq. (4)}$$

where the "1" subscripts denote a first transmitted signal stream and the "2" subscripts denote a second transmitted signal stream. Such notation assumes that stream 1 is transmitted from a first transmit antenna and stream 2 is transmitted from a second transmit antenna.

The receiver 10 then uses the combined value to calculate the phase change indicative of inter-slot receiver frequency error. In one embodiment, the receiver 10, e.g., by appropriate hardware and/or software configuration of the fine AFC processor 28, calculates the phase change as $$\hat{\phi}(n) = \arctan\left(\frac{\text{im}(\psi(n))}{\text{re}(\psi(n))}\right). \quad \text{Eq. (5)}$$

Further, in at least one embodiment, the fine AFC processor 28 or another computing element within the baseband processing circuits 22 is configured to simplify the arctan computation based on the recognition that, with reasonably good coarse AFC in the receiver's front-end circuitry 16, the phase error observed between consecutive time slots will be relatively small (near zero). As such, the simplifying approximations sin φ≈φ and cos φ≈1 can be used to simplify Eq. (5) as $$\hat{\phi}(n) = \frac{\text{im}(\psi(n))}{|\psi(n)|}. \quad \text{Eq. (6)}$$

Note, too, that the above phase error calculation can be based directly on the pilots, rather than the net channel estimates. Assuming a known pilot symbol value of 1+j (or 1−j), the pilot-based solution to Eq. (5) would include a built-in 45 degree phase angle, and deviations from that nominal pilot symbol phase angle (rather than deviations from zero) would indicate the phase change between slots. In this regard, use of the net channel estimates effectively de-rotates the phase angle of the pilot symbols to zero and allows the simplifying approximations of Eq. (6) to be implemented in the receiver 10. However, use of the receiver's combining weights to make phase change observations that are substantially free from ISI influences can be done using either pilots or net channel estimates.

As a further enhancement in the overall process of controlling the phase de-rotator 18 based on the calculated slot-to-slot phase changes, the phase error (frequency error) determined between given slots can be used in a filtering process, such as $$\phi_f(n) = \phi_f(n-1) + \alpha \cdot [\hat{\phi}(n) - \phi_f(n-1)]. \quad \text{Eq. (7)}$$

Thus, the filtered value $\phi_f(n)$ can be used by the fine AFC processor 28 to make less noisy and better controlled adjustments to the phase de-rotator 18.

As a non-limiting numeric example of the above-contemplated processing, one may assume a coarse AFC step adjustment resolution of 0.05 ppm. At a received signal carrier frequency of interest of 1.95 GHz, that resolution translates into coarse AFC adjustments of 97 Hz per step, yielding a maximum frequency error for the receiver 10 of ±48.5 Hz (at the coarse AFC adjustment level). Assuming 1,500 reception time slots per second, the maximum rotation error per slot (with only coarse AFC) is ±48.5 (Hz)*360 (degrees)/1500 (slots per second)=±11.64 degrees.

While that amount of error may be tolerable for some reception scenarios and modulation/coding schemes, it can seriously degrade reception performance for the receiver 10 in scenarios using complex, higher-order modulation constellations. For example, assuming that the received communication signal of interest uses QAM-64 (64 symbol Quadrature Amplitude Modulation), a per-slot frequency error of ±11.64 degrees would produce rotational "smearing" of the QAM-64 constellation to an extent that would significantly impair the receiver's ability to reliably differentiate received symbol values. More broadly, that amount of error would degrade reception performance for QAM-16 and higher. The fine AFC processor 28 taught herein, and its use of the receiver's ISI-canceling combining weights to calculate phase change between slots arising from receiver frequency error, allows a second level of AFC that is finer than coarse AFC. That is, the inter-slot frequency error compensation taught herein provides for frequency error compensation that is potentially much higher in resolution than first-level, coarse AFC control obtained through down-conversion oscillator trimming, etc.

For a digital implementation of the phase de-rotator 18, one may continue the above numeric example assuming a rotational correction range of [−94, +82] Hz, in steps of approximately 11.72 Hz. Expressing the previously calculated maximum phase change per slot with coarse AFC in degrees, one finds that the maximum rotational error per slot with only coarse AFC control is ±5.86 (Hz)*360 (degrees)/1500 (slots per second)=±1.4 degrees. With the advantageous processing taught herein, the amount of rotation between or across slots is accurately calculated by the fine AFC processor 28, using the combining channel weights from a previous slot and the net channel coefficients (or pilots) from the current slot. As the prior slot's combining weights were computed to accurately minimize frequency error in the previous slot, their usage in combining values in the current slot will reveal the phase rotation arising from receiver frequency error between the prior and the current slot.

That is, the combined value ψ as taught herein would represent a single pilot point located at 0 degrees, if there were no receiver frequency error. (Or would represent a single point at the defined phase angle of the pilot values, if pilot symbols rather than net channel coefficients are used to compute the combined value.) In any case, the receiver 10 can be configured to translate the calculated phase change into degrees as $$\hat{\phi}(n) = \frac{360 \cdot \arctan(\psi)}{2\pi} = \frac{360 \cdot \text{im}(\psi)}{2\pi \cdot \text{re}(\psi)} \text{ degrees}. \quad \text{Eq. (8)}$$

To avoid rapid changes caused by system glitches, clock jitter and coarse AFC changes, one or more embodiments of the fine AFC processor 28 clips the value $\hat{\phi}(n)$ to restrict its allowed numeric range. For example, $\hat{\phi}(n)$ can be limited to a range of ±8 degrees, or limited to some other defined numeric range appropriate for the design at hand. With this approach, the phase change as calculated between any given current and prior reception time slots would not be permitted to exceed +8 degrees or fall below −8 degrees. Further, as noted, the calculated phase changes can be smoothed using, e.g., exponential filtering. An example filtering value of 0.05 may be used thusly $$\phi_f(n) = \phi_f(n-1) + 0.05 \cdot [\hat{\phi}(n)\phi_f(n-1)]. \quad \text{Eq. (9)}$$

The filtered value can be used to calculate de-rotator adjustment as $$\omega(n) = \frac{\phi_f(n)}{11.72}, \quad \text{Eq. (10)}$$

where 11.72 is the rotational correction resolution given by way of example for the phase de-rotator 18. In at least one embodiment, the phase de-rotator 18 is configured to receive digital control words (e.g., a 4-bit word) that takes on values from −8 to +7, reflecting corrections ranging from −94 Hz to +82 Hz in steps of 11.72 Hz (equivalent of 2.8 degrees per slot). Therefore, in one or more embodiments, the calculated ω(n) value is rounded and then clipped to the maximum range of [−8, 7], and then applied by the fine AFC processor 28 to the phase de-rotator 18, to control the amount of phase de-rotation applied by the phase de-rotator 18. Preferably immediately after changing the phase de-rotator's adjustment, the receiver 10 should change the value of $\phi_f(n)$ in the opposite direction, to reflect the anticipated frequency change. Also, because filtering improves frequency error estimation, it generally will be sufficient to run these AFC calculations on only one received signal stream in a multi-stream reception environment, as the frequency error in any other streams will be the same.

It also should be understood that, if the phase de-rotator 18 has a resolution of 10 Hz for example, then the fine AFC processor 28 would defer adjustment until the determined frequency error exceeds ±5 Hz. If the determined receiver frequency error is, for example, +5.3 Hz, the fine AFC processor 28 would change the de-rotator's "speed" by −10 Hz, and the resulting frequency error would then be −4.7 Hz. In general, adjustments of the phase de-rotator 18 by the fine AFC processor 28 are made in accordance with the resolution capability of the phase de-rotator 18.

As another numeric example, one may assume a series of reception time slots having respective frequency errors (in degrees) of +3.2, +4.5, +7.5, +5.0, +9.0, +7.1, +6.9, +10.2, and so on. Filtering these values, the receiver 10 obtains +3.1, +3.3, +3.6, +4.1, +5.2, +6.0, +6.7, +8.1, and so on. From these values, one sees that the frequency error is growing across succeeding slots, which is normal. The determined frequency error for any given time slot generally is not used to de-rotate data in that same time-slot. Instead, the phase de-rotator 18 performs ongoing de-rotation of incoming received signal values according to the control word value or other control signal from the fine AFC processor 28. In turn, the fine AFC processor 28 monitors the (preferably filtered) receiver frequency errors as they are determined over some number of slots, e.g., tens or hundreds of slots.

In response to the determined receiver frequency error growing larger than the adjustment resolution of the phase de-rotator 18, the fine AFC processor 28 updates its control word or otherwise updates the phase de-rotator control signal to change the amount of phase de-rotation applied. For example, the speed of the phase de-rotator 18 may be set at −200 Hz, and it may have a step change resolution of 10 Hz. Thus, if the filtered frequency error grows larger than +5 Hz, for example, the fine AFC processor 28 would issue a command to the phase de-rotator 18, to change its speed to −210 Hz. Although there may be some delays due to buffering, the receiver 10 should enjoy a reduction in constellation smearing after making the de-rotator adjustment.

In addition to the inter-slot frequency error compensation as has been described thus far, the fine AFC processor 28 additionally or alternatively performs intra-slot frequency error compensation. Referring again to FIG. 3, one sees that the reception time slots 34 can be (at least logically) subdivided into a number of sub-slots 36, and with intra-slot frequency error compensation, the fine AFC processor 28 adjusts the combining weights w(n) on a sub-slot basis, to account for differences in receiver frequency error manifested across sub-slots. That is, there may be changes in receiver frequency error within each slot 34 that are not addressed by the combining weights w(n), which can be understood as being computed in an overall or average sense for use over a whole slot 34. For example, the combining weights w(n) may be computed from net channel coefficients that represent an averaging or other combining of per-pilot estimates taken across the slots.

Intra-slot frequency error changes may arise from, for example, residual frequency error remaining after any inter-slot frequency error compensation applied by the fine AFC processor 28. Intra-slot errors also arise because of clock jitter and other semi-random, higher-frequency sources of frequency error. Advantageously, intra-slot frequency error compensation as taught herein recognizes that the underlying channel conditions change slowly on a sub-slot basis. Therefore, rather than computing entirely new combining weights w on a sub-slot basis (which would be computationally expensive), the fine AFC processor 28 in one or more embodiments computes a conventional set of combining weights w(n) for each slot 34, and then makes error-related phase adjustments to those weights for each sub-slot 36. Doing so creates a sub-slot specific set of combining weights w(n,k) for each sub-slot 36, having phase information tailored to the frequency error manifest within that sub-slot 36. The "n" denotes the n-th given slot 34, and the "k" denotes a given sub-slot 36 within the n-th slot 34.

Therefore, according to one aspect of the teachings presented herein, it is proposed to use a default set of combining weights produced once per slot (based on the average channel estimates developed from the set of pilots received within the slot) and to modify the combining weight phase information in each sub-slot, to compensate for instantaneous phase error in each such sub-slot. Sub-slot phase error can be computed for each sub-slot using the default set of combining weights computed for the overall slot, in conjunction with the specific pilots received within the sub-slot.

Thus, one or more embodiments herein implement an intra-slot frequency error compensation method wherein the combining weights generated in each reception time slot are based on channel coefficients averaged or otherwise combined over the reception time slot. Further, performing intra-slot frequency error compensation within in each reception time slot is based on logically dividing each reception time slot into a plurality of sub-slots, determining a sub-slot phase error relative to an average phase error of the reception time slot, generating sub-slot combining weights specific to each sub-slot by phase-adjusting the combining weights according to the sub-slot phase error, and performing data combining for the sub-slot according to the sub-slot combining weights. In at least one embodiment, such processing includes combining pilot values or channel coefficients particularly corresponding to each sub-slot using the combining weights generated for the reception time slot, to obtain a complex sub-slot combined value, and determining the sub-slot phase error from the complex sub-slot combined value. Further, the method may include determining the sub-slot phase error from the complex sub-slot combined value by determining a best-fit line via linear regression for the complex sub-slot combined values determined for the plurality of sub-slots and, for each sub-slot, setting the sub-slot phase error value as a point on the best-fit line mapped from the complex sub-slot phase error obtained for the sub-slot.

The above processing thus can be understood as phase error compensation within sub-slots of each given reception time slot, through manipulation of the combining weights computed for the overall slot. Assuming that a given slot 34 includes ten pilots, and that sub-slot divisions are made per pilot—one pilot per sub-slot—this approach would entail generating ten sub-slot compensated sets of combining weights, one set for each sub-slot 36. These ten new sets of combining weights would then be used to combine data in each respective part of the slot.

As an example, the phase error estimate, $\hat{\chi}(n,k)$ to be used for the combining weights w(n,k) in the k-th sub-slot 36 in the n-th slot 34 can be computed as $$\hat{\chi}(n,k) = w^H(n) \cdot \hat{h}(n,k), \qquad \text{Eq. (11)}$$

where $\hat{h}(n,k)$ is the net channel response as determined from the pilots received in the k-th sub-slot 36, and $\hat{\chi}(n,k)$ is a single complex coefficient having phase information that indicates how the phase error in the k-th sub-slot 36 differs from the average phase error across the slot.

Thus, $\hat{\chi}(n,k)$ represents a complex sub-slot combined value whose phase information is indicative of the sub-slot phase error relative to the average phase error for the n-th slot 34. Notably, the default set of combining weights w(n) are computed for the overall n-th slot 34 and are intended to null the average phase error for the slot. As such, using the phase information from $\hat{\chi}(n,k)$ for the k-th sub-slot 36, the receiver 10 produces sub-slot specific combining weights w(n,k) from the average combining weights w(n). Note, too, that Eq. (11) can be adapted to MIMO and other multi-stream examples, along the lines shown for Eq. (4), such as, $$\hat{\chi}(n,k) = w_1^H(n) \cdot \hat{h}_1(n,k) + w_2^H(n) \cdot \hat{h}_2(n,k). \qquad \text{Eq. (12)}$$

As before, the "1" and "2" subscripts denote transmit antennas/streams.

Continuing with the single-stream example, the value $\hat{\chi}(n,k)$ can be used to apply the proper phase compensation to the combining weights w(n) for use as sub-slot specific combining weights w(n,k). That compensation can be expressed as $$w(n,k) = w(n) \cdot \frac{-\hat{\chi}(n,k)}{|\hat{\chi}(n,k)|}, \qquad \text{Eq. (13)}$$

where the term $$\frac{-\hat{\chi}(n,k)}{|\hat{\chi}(n,k)|}$$

will be understood as producing a complex value whose phase component adjusts the phase of the combining weights w(n) in the opposite direction of the localized phase error in the k-th sub-slot 36.

To better understand this process using a simplified example, one may assume the receipt of ten pilot symbols in a given slot 34, denoted as $p_1, p_2, \ldots, p_{10}$. Taking the first pilot symbol, p1, as an example, the net channel coefficient for sub-slot index k=1 in slot n is denoted as $\hat{h}(n,1)$. This value is computed from the multipath versions of $p_1$ taken at the processing delays, but the other pilots ($p_2, p_3, \ldots, p_{10}$) are not used. The extent to which the default set of combining weights w(n) do not produce a zero-phase value from the net channel coefficients $\hat{h}(n,1)$ reflects the extent to which the receiver frequency error in sub-slot 1 differs from the slot average. Using this approach, a sub-slot specific set of combining weights is computed for each sub-slot 36.

Of course, depending on practical combiner implementation considerations, the slots 34 may be divided into fewer sub-slots 36, e.g., where each sub-slot encompasses more than one pilot. Fewer sub-slots means fewer sets of sub-slot specific combining weights, and generally entails less processing complexity, buffering, etc. Broadly, a variable number of combing weight sets could be produced per slot. For example, if a combiner (e.g., a combiner within equalizer 48 of FIG. 5) can only accept five sets of combining weights per slot 34, then pairs of per-pilot phase error estimates can be grouped together and averaged. That is, assuming ten pilots but five sub-slots 36, the phase error relevant to each pilot can be determined from that pilot and the default set of combining weights developed from the average of the ten pilots. Pairs of these calculated phase errors can then be used to compensate the default set of combining weights for use within a sub-slot 36 that spans both such pilots.

If each slot 34 includes ten pilots, such an arrangement means that five sets of sub-slot combining weights are computed for each slot 34, with a pair of pilots in each sub-slot 36. For such configurations, Eq. (11) can be modified as $$\hat{\chi}(n,k) = w^H(n) \cdot \sum_{p=1}^{P} \hat{h}_p(n,k), \qquad \text{Eq. (14)}$$

where the summation encompasses all the pilots falling within the k-th sub-slot 36. Such notation assumes that the pilots are indexed relative to the beginning of the k-th sub-slot 36 and there are P pilots within each k-th sub-slot 36.

As a numeric example, one may assume that a small residual frequency error remains un-cancelled after any inter-slot frequency error compensation applied by the fine AFC processor 28. As such, the pilots and corresponding "perceived" modulation constellations would gradually rotate within each slot 34. Assuming ten pilots are received at equal spacing across the n-th slot 34, sub-slot errors across ten sub-slots 36 might be: Pilot 1/10 phase: +3.1 degrees; Pilot 2/10 phase: +2.2 degrees; Pilot 3/10 phase: +1.1 degrees; Pilot 4/10 phase: +1.7 degrees; Pilot 5/10 phase: +0.5 degrees; Pilot 6/10 phase: −0.3 degrees; Pilot 7/10 phase: −1.3 degrees; Pilot 8/10 phase: −2.0 degrees; Pilot 9/10 phase: −2.2 degrees; and Pilot 10/10 phase: −2.8 degrees. Note that the average phase error across any given slot is zero, and that the change observed within the slot is not perfectly gradual due to noise and oscillator jitter.

The intra-slot frequency error compensation contemplated above is best used when signal quality is good, e.g., high Signal-to-Interference Ratio (SIR) conditions. This is so because high SIR allows reasonably accurate phase estimation using only one or a sub-set of the pilots received within a given slot 34. Yet this observation is not a significant limitation, as the intra-slot correction contemplated herein is particularly advantageous with QAM-64 and other high-order modulation schemes, which typically are used only in good signal quality conditions.

In at least one embodiment of intra-slot frequency error compensation, the receiver 10 (e.g., the fine AFC processor 28) uses linear regression to lower the complexity of processing needed for intra-slot receiver frequency error compensation. The use of linear regression also improves intra-slot compensation performance, at least where the receiver frequency error changes linearly across each slot 34. The receiver 10 can assume such linear behavior, or it can discern it by analyzing the per sub-slot phase error values determined using Eq. (11) and Eq. (13). That is, the phase compensation applied in each sub-slot 36 can be "plotted" or otherwise evaluated by the fine AFC processor 28 to determine whether the sub-slot errors across a given slot 34 generally follow a linear function. That kind of linear error behavior occurs, for example, from small, residual frequency errors that are below the correction resolution of the inter-slot frequency error compensation that may be applied by the fine AFC processor 28.

With the linear regression approach, the phase offset estimate for sub-slot k in slot n is then given by $$\hat{\phi}(n,k) = \alpha(n) + \beta(n), \qquad \text{Eq. (15)}$$

where the parameters $\alpha(n)$ and $\beta(n)$ are obtained by a least squares fit to the observed values $\hat{\chi}(n,k)$. Basically, $\hat{\phi}$ is expected to be zero in the middle of the slot, i.e., at $k_{mean}=0.5 (k_{max}-k_{min})$. Hence, $\beta(n)$ could be set to $-\alpha(n) \cdot k_{mean}$, thereby simplifying linear regression and improving $\alpha(n)$ estimation quality. Additionally, $\alpha(n)$ may be filtered in order to further smooth the estimate.

In an example linear regression embodiment, the new, phase corrected combining weights for the k-th sub-slot 36 in the n-th slot 34 are calculated by $$w(n,k) = w(n) \cdot e^{-j\hat{\phi}(n,k)}. \qquad \text{Eq. (16)}$$

The use of linear regression further improves phase estimation quality and thus makes it possible to benefit from phase correction even at lower SINR ratios.

Figure 6:
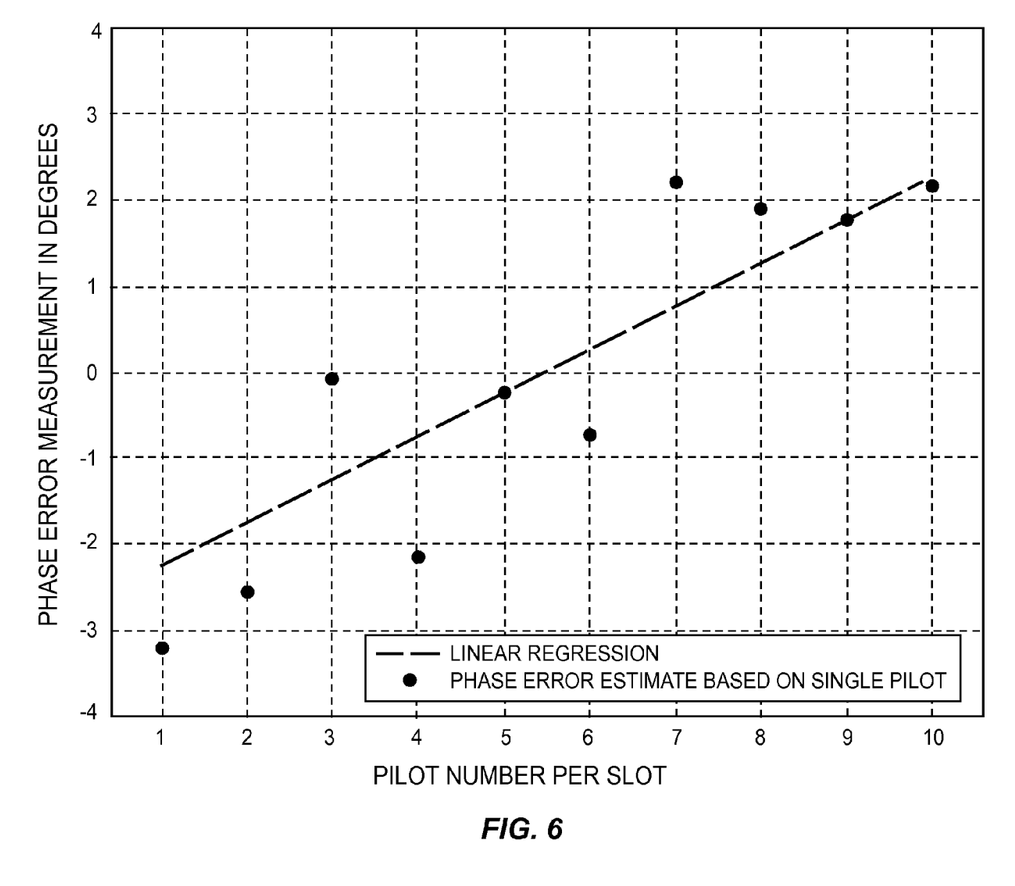
FIG. 6 is a plot of an example set of sub-slot phase errors and a corresponding best-fit line, as may be used in intra-slot frequency error compensation in a wireless communication receiver.

For an understanding of this improvement, FIG. 6 depicts an example set of phase error estimates, $\hat{\chi}(n,k)$ within a given slot 34, each estimate determined from a single one of the ten pilots. One sees that the phase error estimates are not uniform, with the differences arising from clock jitter and other anomalies that make sub-slot estimations of this type potentially noisy. By determining the best-fit line through the set of sub-slot phase error estimates, the fine AFC processor 28 can use points on the best-fit line as the phase correction values for compensating the sub-slot combining weights, rather than the "raw" calculated values of sub-slot phase error. Mapping to the best-fit line in this manner eliminates or greatly reduces "noise" from the sub-slot compensation process.

Whether or not linear regression is used, the proposed intra-slot frequency error compensation provides for effective removal of residual phase error remaining after operation the phase de-rotator 18 as part of fine AFC carried out by the fine AFC processor 28. In particular, the residual remaining phase error being a consequence of limited de-rotator resolution can be cancelled almost completely. Also, faster frequency changes, for example, due to varying mobility speed can also be mostly mitigated. The approach even provides for at least partial compensation of oscillator jitter.

As for the fine AFC described earlier herein, the slot-to-slot phase error calculations are significantly more accurate than calculations that do not incorporate ISI cancellation. More accurate determination of the receiver frequency error correspondingly allows for more accurate frequency error control, particularly in high SIR scenarios where noise is low and ISI dominates received signal impairments. The increased accuracy also permits more aggressive filtering of the calculated (slot-to-slot) phase changes, ψ (i.e., faster/shorter filters). The faster filter response in turns provides the receiver 10 with faster frequency error compensation response.

Of course, the present invention is not limited by the foregoing discussion nor by the accompanying drawings. Instead, the present invention is limited only by the appended claims and their legal equivalents.

What is claimed is:

1. A method of correcting for receiver frequency error in an inter-symbol interference (ISI) canceling receiver that is configured to generate ISI-canceling combining weights in each reception time slot for combining received signal values in the reception time slot, said method comprising:

de-rotating received signal values for demodulation processing by an amount corresponding to a determined receiver frequency error;

calculating phase changes between reception time slots by, for any given pair of current and prior reception time slots, calculating the phase change as a function of the combining weights determined in one of the reception time slots in said given pair and pilot values or corresponding channel estimates for the other one of the reception time slots in said given pair; and determining the receiver frequency error, as used for de-rotating the received signal values, as a function of the calculated phase changes.

2. The method of claim 1, wherein determining the receiver frequency error comprises filtering the calculated phase changes to obtain a filtered receiver frequency error value, and adjusting a phase de-rotator responsive to the filtered receiver frequency error value exceeding an adjustment step size of the phase de-rotator, said phase de-rotator configured to de-rotate the received signal values.

3. The method of claim 1, wherein calculating the phase change between reception time slots comprises, for a given pair of current and prior reception time slots, generating a complex combined value by combining pilot values or corresponding channel coefficients from one of the reception time slots using combining weights computed for the other one of the reception time slots, and determining the phase change between the given current and prior reception time slots from the combined value.

4. The method of claim 3, wherein determining the phase change between the given current and prior reception time slots from the combined value generated for those given current and prior reception time slots comprises computing or approximating an arctan of a ratio of an imaginary component of the combined value to a magnitude of the combined value.

5. The method of claim 4, wherein the arctan is computed if the combined value is formed using pilot values and is approximated using simplified sin and cosine representations if the combined value is formed using net channel coefficients estimated from the pilot values.

6. The method of claim 3, wherein generating the complex combined value comprises combining net channel coefficients obtained for multipath processing delays in one of the reception time slots according to the combining weights generated for those same multipath processing delays in the other one of the reception time slots, wherein the given prior reception time slot in the given pair of current and prior reception time slots is an immediately preceding reception time slot.

7. The method of claim 1, wherein de-rotating received signal values for demodulation processing by an amount corresponding to the determined receiver frequency error comprises de-rotating incoming received signal values via a phase de-rotator in either an analog domain or a digital domain across reception time slots on an ongoing basis, by an amount that is set as a function of the determined receiver frequency error.

8. The method of claim 7, wherein the amount by which the phase de-rotator de-rotates the received signal values is set based on the determined receiver frequency error, which is computed by filtering successive ones of the calculated phase changes.

9. The method of claim 1, wherein the combining weights generated in each reception time slot are based on channel coefficients averaged or otherwise combined over the reception time slot, and wherein the method further comprises performing intra-slot frequency error compensation within in each reception time slot by logically dividing each reception time slot into a plurality of sub-slots, determining a sub-slot phase error relative to an average phase error of the reception time slot, generating sub-slot combining weights specific to each sub-slot by phase-adjusting the combining weights according to the sub-slot phase error, and performing data combining for the sub-slot according to the sub-slot combining weights.

10. The method of claim 9, wherein determining the sub-slot phase error for each sub-slot comprises combining pilot values or channel coefficients particularly corresponding to each sub-slot using the combining weights generated for the reception time slot, to obtain a complex sub-slot combined value, and determining the sub-slot phase error from the complex sub-slot combined value.

11. The method of claim 10, wherein determining the sub-slot phase error from the complex sub-slot combined value comprises determining a best-fit line via linear regression for the complex sub-slot combined values determined for the plurality of sub-slots and, for each sub-slot, setting the sub-slot phase error value as a point on the best-fit line mapped from the complex sub-slot phase error obtained for the sub-slot.

12. A wireless communication receiver configured to generate inter-symbol interference (ISI) canceling combining weights in each reception time slot for combining received signal values in the reception time slot, said wireless communication receiver comprising one or more processing circuits configured to:
  de-rotate received signal values for demodulation processing by an amount corresponding to a determined receiver frequency error;
  calculate phase changes between reception time slots by, for any given pair of current and prior reception time slots, calculating the phase change as a function of the combining weights determined in one of the reception time slots in said given pair and pilot values or corresponding channel estimates for the other one of the reception time slots in said given pair; and
  determine the receiver frequency error, as used for de-rotating the received signal values, as a function of the calculated phase changes.

13. The wireless communication receiver of claim 12, wherein the one or more processing circuits are configured to determine the receiver frequency error by filtering the calculated phase changes to obtain a filtered receiver frequency error value, and adjusting a phase de-rotator responsive to the filtered receiver frequency error value exceeding an adjustment step size of the phase de-rotator, said phase de-rotator configured to de-rotate the received signal values.

14. The wireless communication receiver of claim 12, wherein the one or more processing circuits are configured to calculate the phase change between reception time slots by, for a given pair of current and prior reception time slots, generating a complex combined value by combining pilot values or corresponding channel coefficients from one of the reception time slots using combining weights computed for the other one of the reception time slots, and determining the phase change between the given current and prior reception time slots from the combined value.

15. The wireless communication receiver of claim 14, wherein the one or more processing circuits are configured to determine the phase change between the given current and prior reception time slots from the combined value generated for those given current and prior reception times slots by computing or approximating an arctan of a ratio of an imaginary component of the combined value to a magnitude of the combined value.

16. The wireless communication receiver of claim 15, wherein the one or more processing circuits are configured to compute the arctan, if the receiver is configured to form the combined value using pilot values, and to approximate the arctan using simplified sin and cosine representations, if the receiver is configured to form the combined value using net channel coefficients estimated from the pilot values.

17. The wireless communication receiver of claim 14, wherein the one or more processing circuits are configured to generate the complex combined value for any given pair of current and prior reception time slots by combining net channel coefficients obtained for multipath processing delays in one of the reception time slots according to the combining weights generated for those same multipath processing delays in the other one of the reception time slots, and wherein the given prior reception time slot is an immediately preceding reception time slot.

18. The wireless communication receiver of claim 12, wherein the one or more processing circuits are configured to de-rotate received signal values for demodulation processing by an amount corresponding to the determined receiver frequency error by de-rotating incoming received signal values via a phase de-rotator across reception time slots on an ongoing basis, in either an analog domain or a digital domain, by an amount that is set as a function of the determined receiver frequency error.

19. The wireless communication receiver of claim 18, wherein the one or more processing circuits are configured to set the amount by which the phase de-rotator de-rotates the received signal values based on filtering successive ones of the calculated phase changes and determining the receiver frequency error from the filtered, calculated phase changes.

20. The wireless communication receiver of claim 12, wherein the combining weights generated in each reception time slot are based on channel coefficients averaged or otherwise combined over the reception time slot, and wherein the one or more processing circuits are configured to perform intra-slot frequency error compensation within in each reception time slot by logically dividing each reception time slot into a plurality of sub-slots, determining a sub-slot phase error relative to an average phase error of the reception time slot, generating sub-slot combining weights specific to each sub-slot by phase-adjusting the combining weights according to the sub-slot phase error, and performing data combining for the sub-slot according to the sub-slot combining weights.

21. The wireless communication receiver of claim 20, wherein the one or more processing circuits are configured to determine the sub-slot phase error for each sub-slot by combining pilot values or channel coefficients particularly corresponding to each sub-slot using the combining weights generated for the reception time slot, to obtain a complex sub-slot combined value, and determining the sub-slot phase error from the complex sub-slot combined value.

22. The wireless communication receiver of claim 21, wherein the one or more processing circuits are configured to determine the sub-slot phase error from the complex sub-slot combined value by determining a best-fit line via linear regression for the complex sub-slot combined values, as determined for the plurality of sub-slots, and, for each sub-slot, setting the sub-slot phase error value as a point on the best-fit line mapped from the complex sub-slot phase error obtained for the sub-slot.

* * * * *

UNITED STATES PATENT AND TRADEMARK OFFICE
CERTIFICATE OF CORRECTION

PATENT NO.       : 9,036,750 B2
APPLICATION NO.  : 13/141521
DATED            : May 19, 2015
INVENTOR(S)      : Niewczas et al.

Page 1 of 1

It is certified that error appears in the above-identified patent and that said Letters Patent is hereby corrected as shown below:

Specification

In Column 8, Lines 51-52, delete "front-end circuitry 16." and insert -- front-end circuitry 14. --, therefor.

In Column 10, Line 9, delete "front-end circuitry 16," and insert -- front-end circuitry 14, --, therefor.

In Column 11, Line 49, in Equation (9), delete " $\phi_f(n) = \phi_f(n-1) + 0.05 \cdot [\hat{\phi}(n)\phi_f(n-1)].$ " and insert -- $\phi_f(n) = \phi_f(n-1) + 0.05 \cdot [\hat{\phi}(n) - \phi_f(n-1)].$ --, therefor.

Signed and Sealed this
Second Day of August, 2016

Michelle K. Lee
*Director of the United States Patent and Trademark Office*